(12) United States Patent
Ro

(10) Patent No.: US 7,231,392 B2
(45) Date of Patent: Jun. 12, 2007

(54) METHOD AND APPARATUS FOR BLOCKING CONTENTS OF PORNOGRAPHY ON INTERNET

(75) Inventor: Yong Man Ro, DaeJeon (KR)

(73) Assignee: Interjungbo Co., Ltd., Seoul (KR)

( * ) Notice: Subject to any disclaimer, the term of this patent is extended or adjusted under 35 U.S.C. 154(b) by 291 days.

(21) Appl. No.: 10/276,300

(22) PCT Filed: May 22, 2001

(86) PCT No.: PCT/KR01/00843

§ 371 (c)(1),
(2), (4) Date: Nov. 22, 2002

(87) PCT Pub. No.: WO01/90941

PCT Pub. Date: Nov. 29, 2001

(65) Prior Publication Data

US 2003/0121035 A1    Jun. 26, 2003

(30) Foreign Application Priority Data

May 22, 2000    (KR)    ................. 2000/27408

(51) Int. Cl.
  *G06F 17/30*    (2006.01)
  *G06F 7/00*    (2006.01)
(52) U.S. Cl. ................................................ 707/10
(58) Field of Classification Search .................. 707/10
  See application file for complete search history.

(56) References Cited

U.S. PATENT DOCUMENTS

| 5,828,402 | A | * | 10/1998 | Collings ........................ 725/28 |
| 5,835,722 | A | * | 11/1998 | Bradshaw et al. .......... 709/225 |
| 6,038,367 | A | * | 3/2000 | Abecassis ...................... 386/46 |
| 6,266,664 | B1 | * | 7/2001 | Russell-Falla et al. .......... 707/5 |
| 6,314,569 | B1 | * | 11/2001 | Chernock et al. .............. 725/37 |
| 6,457,010 | B1 | * | 9/2002 | Eldering et al. ............... 707/10 |
| 6,493,744 | B1 | * | 12/2002 | Emens et al. .................. 725/28 |
| 6,539,430 | B1 | * | 3/2003 | Humes ......................... 709/225 |
| 6,567,979 | B1 | * | 5/2003 | deCarmo ....................... 725/25 |
| 6,633,855 | B1 | * | 10/2003 | Auvenshine .................. 706/15 |
| 6,684,240 | B1 | * | 1/2004 | Goddard ....................... 709/217 |
| 6,760,915 | B2 | * | 7/2004 | deCarmo ....................... 725/28 |
| 6,785,901 | B1 | * | 8/2004 | Horiwitz et al. ............... 725/25 |
| 2001/0041053 | A1 | * | 11/2001 | Abecassis ..................... 386/83 |
| 2003/0110168 | A1 | * | 6/2003 | Kester et al. .................. 707/6 |

* cited by examiner

*Primary Examiner*—Jeffrey Gaffin
*Assistant Examiner*—Cindy Nguyen
(74) *Attorney, Agent, or Firm*—Lowe Hauptman & Berner LLP

(57) ABSTRACT

Provided is an improved pornography blocking technique which blocks pornography on the basis of the contents of multimedia data. First, feature descriptor is extracted from multimedia data inputted from the Internet by using MPEG-7 scheme. And referring to reference pornography database which stores reference pornography in the form of feature descriptor, the similarity degree between the extracted feature descriptor and the feature descriptor of the reference pornography is measured by calculating the vector distance between the two feature descriptors. And it is determined whether the inputted multimedia data is pornography or not, by comparing the measured similarity degree with the similarity measurement threshold value. According to the invention, accurate pornography determining is possible, because the invention uses the contents of the multimedia data for determining. And rapid and efficient pornography determining is possible, because the invention uses feature descriptor with less information, instead of the original multimedia data.

35 Claims, 15 Drawing Sheets a) SINOGRAM  b) FOURIER TRANSFORM

METHOD AND APPARATUS FOR BLOCKING CONTENTS OF PORNOGRAPHY ON INTERNET

This is a nationalization of PCT/KR01/00843, filed May 22, 2001 and published in English.

BACKGROUND OF THE INVENTION

1. Field of the Invention

The present invention relates to a method and an apparatus for blocking contents of pornography on internet and particularly, to improved technology for blocking multimedia pornography based on contents of multimedia data.

2. Description of the Related Art

Recently, as personal computer and internet are widely used, the use of services on internet is also increased, for example, World Wide Web (hereinafter referred to as web), File Transfer Protocol FTP and e-mail. In particular, various data provided on internet increase the use of internet. And, with the development of e-business, various multimedia contents including sound, music, image, video and three dimensional visual image are provided on internet. However, there is opposite effect that it is easy to access porno sites on internet and particularly, it becomes a severe social problem that juveniles are exposed to pornography on internet. And, the technological development for blocking contents of pornography is slower than that of the contents.

In a conventional method, pornography is blocked by analyzing URL address and characters of transferred data. However, the method has a limitation in blocking multimedia data. Therefore, a technology has been required that pornography is determined and the site is blocked according to contents of multimedia data. However, it is difficult and takes much time to analyze contents of enormous digital multimedia data provided on internet for determining pornography.

Recently, MPEG-7 has been formed for effectively storing and searching enormous multimedia data and efforts are being focused on the international standardization thereof. The standardization of MPEG-7 comprises a descriptor describing features of multimedia data such as audio, sound, image and video with small size and high efficiency and descriptor scheme formed by combining these descriptors. The MPEG-7 descriptor is expressed in a feature vector form by extracting features in the contents of data such as spatial relation, color, texture, shape, movement, sound, range of tone and spectrum.

SUMMARY OF THE INVENTION

Therefore, the present invention has been made to solve the above problems and an object of the invention is to provide a method and an apparatus for accurately determining and blocking pornography on the basis of the contents of multimedia data.

And, another object of the present invention is to provide a method and an apparatus for determining whether the inputted multimedia data is a pornography or not and blocking the pornography with high speed and efficiency.

In order to accomplish the above objects, according to the present invention, a filtering method of pornography contents on the basis of contents of multimedia comprises the steps of extracting feature descriptor in the inputted multimedia data and measuring degree of similarity between the extracted feature descriptor and that of reference pornography contents. Then, the measured similarity degree and threshold value of similarity are compared for determining whether it is a pornography or not. Here, the reference pornography is stored in a database in a form of feature descriptor and degree of similarity is measured by referring to the database of reference pornography. The measurement of similarity is accomplished by measuring the vector distance between extracted feature descriptor and that of reference pornography contents. The feature descriptor is desirably extracted on image data of multimedia data on the basis of MPEG-7 and especially, texture descriptor on basis of MPEG-7 is desirable.

The process may further comprise the step for inputting threshold value of similarity measurement and when pornography contents are determined, it is desirable to further comprise the step for indicating the determination in a display or the step for blocking the multimedia data.

The reference pornography contents are classified into two or more grades and the pornography grade of inputted multimedia data can be determined by each grade. The threshold values of similarity measurement are various according to grades.

And, according to the present invention, feature descriptor is extracted from multimedia data inputted on internet and referring to database of reference pornography stored in the form of feature descriptor, the similarity degree is measured by measuring vector distance between extracted feature descriptor and feature descriptor of reference pornography. And, it is determined whether the inputted multimedia data is a pornography or not by comparing the measured similarity degree with the similarity measurement threshold value.

It is desirable to further comprise a step for indicating the position on Internet or for blocking the inputted multimedia data when it is determined as pornography contents.

And, according to the present invention, feature descriptor is extracted after multimedia data is inputted from storage and then referring to database of reference pornography stored in a form of feature descriptor, similarity degree is measured by measuring vector distance between extracted feature descriptor and the feature descriptor of reference pornography. And, it is determined whether the inputted multimedia data is a pornography or not by comparing the measured similarity degree with the similarity measurement threshold value.

It is desirable to further comprise a step for indicating image data on display or indicating the position in the storage or deleting the multimedia data from storage according to input of predetermined control signal when it is determined as pornography contents.

And, in a method of automatically generating database of pornography according to the present invention, multimedia data is inputted from internet sites for filtering and feature descriptor is extracted from the inputted multimedia data and then, referring to database of reference pornography stored in a form of feature descriptor, vector distance between extracted feature descriptor and that of reference pornography is measured to measure the degree of similarity. And, the measured similarity degree and threshold value of similarity are compared for determining whether it is a pornography or not and when it is determined to be a pornography, the information of internet site is added to pornography database.

It is desirable that a step is further included for gathering multimedia data from internet site for filtering by web search engine and for generating temporary filtering database.

And, according to the present invention, in a method of blocking pornography in a server computer, pornography database is generated as described above, and when a client computer requests connection to internet site stored in pornography database, the connection of the client computer to the internet site is blocked.

And, according to the present invention, in a method of filtering pornography contents of subscriber site, web document of the subscriber site is inputted from subscriber web database and feature descriptor is extracted from multimedia data of the inputted web document and then, referring to database of reference pornography stored in a form of feature descriptor, vector distance is measured between the extracted feature descriptor and that of reference pornography to measure a degree of similarity. Finally, the measured similarity degree and threshold value of similarity is compared to determine whether it is a pornography or not.

It is desirable that when it is determined to be a pornography content, information of the subscriber site is shown in display device of computer for internet service offerer or warning message is transmitted to the subscriber site.

According to the present invention, accurate pornography determining is possible because the invention uses the contents of multimedia data for determining. Moreover, the present invention uses not original multimedia data but small data amount of meta data, therefore rapid and efficient pornography determining is possible.

DETAILED DESCRIPTION OF THE INVENTION

Figure 1:
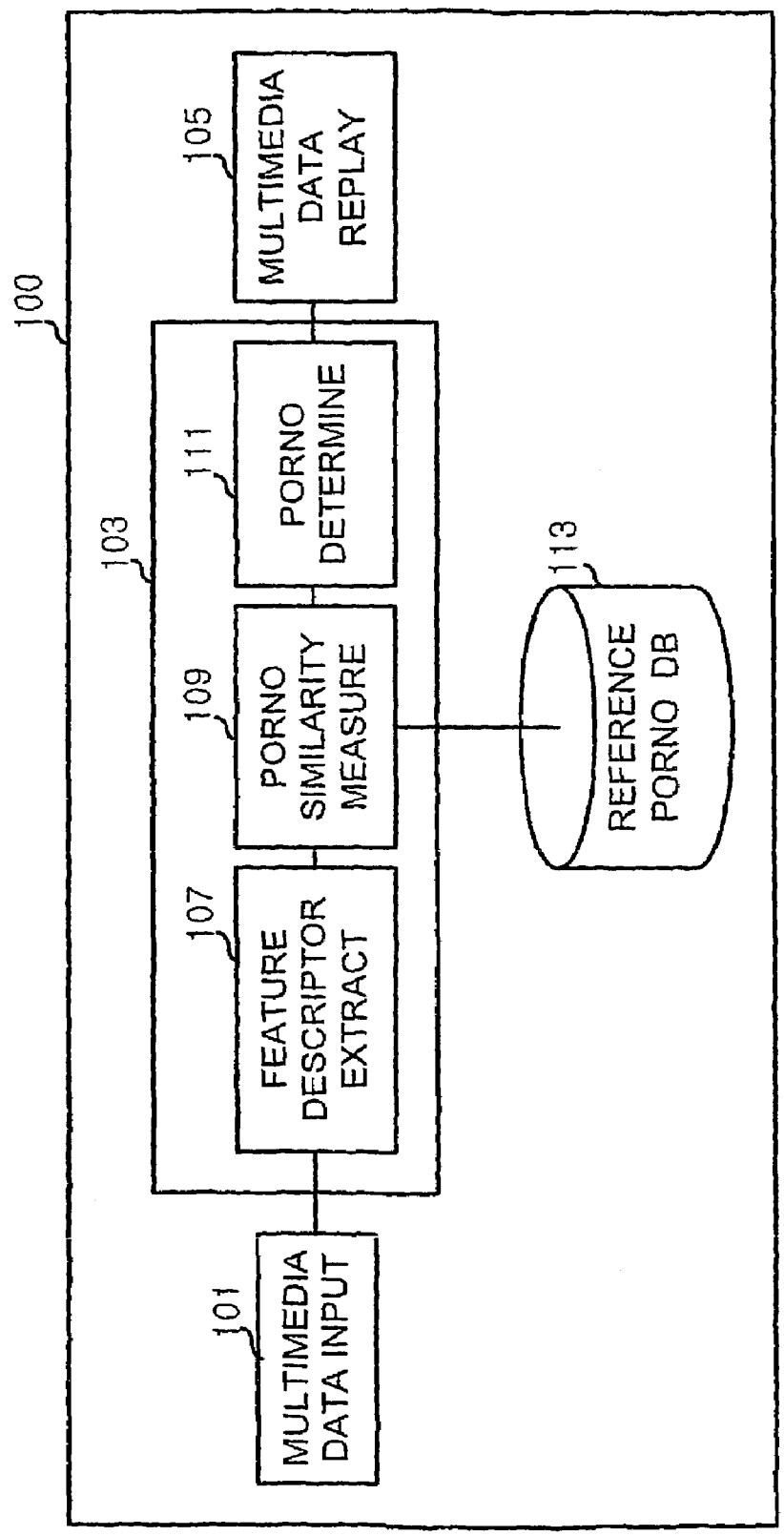
FIG. 1 is a block diagram of engine for blocking pornography according to the present invention.

The objects and features of the invention may be understood with reference to the following detailed description of an illustrative embodiment of the invention, taken together with the accompanying drawings. In the drawings, the same reference codes indicate the same elements.

FIG. 1 is a block diagram of engine for blocking pornography. As shown in FIG. 1, the engine for blocking pornography according to the present invention comprises a multimedia data input part 101, a pornography determining engine part 103 and a multimedia data replay part 105. The pornography determining engine part 103 includes a feature descriptor extracting part 107, a similarity measuring part 109 and a pornography determining part 111 and the similarity measuring part 109 is connected to database 113 of pornography used for reference of similarity measurement (hereinafter referred to as reference pornography).

The multimedia data input part 101 is used to read and store multimedia data such as image, sound and character from network or from storage device. The feature descriptor extracting part 107 is used to extract smaller data effectively describing feature of data stored in the multimedia data input part 101. According to the present invention, the feature descriptor extracting part 107 extracts meta data from inputted databased on MPEG-7 scheme. The MPEG-7 meta data comprises MPEG-7 scheme descriptors describing features such as spatial relation, color, texture, shape, movement, sound, range of tone and spectrum and the structural device thereof. A method of extracting the texture descriptor will be described later. In the preferred embodiment, feature descriptors are extracted by MPEG scheme, however, it is possible to use other extracting methods. The reference pornography is also stored in the reference pornography database 113 in a form of texture descriptor. The similarity measuring part 109 is used to measure the degree of similarity between texture descriptor of reference pornography stored in the reference pornography database 113 and feature descriptor of image data extracted from the feature descriptor extracting part 107. A method of measuring the degree of similarity will be described later. The pornography determining part 111 is used to determine whether the inputted image data is pornography or not by comparing the similarity degree measured in the similarity measuring part 109 and threshold value of similarity. The multimedia replay part 105 is used to replay multimedia data in an original form such as image, sound and character and to block the replay when it is determined to be a pornography in the pornography determining part 111.

Figure 2:
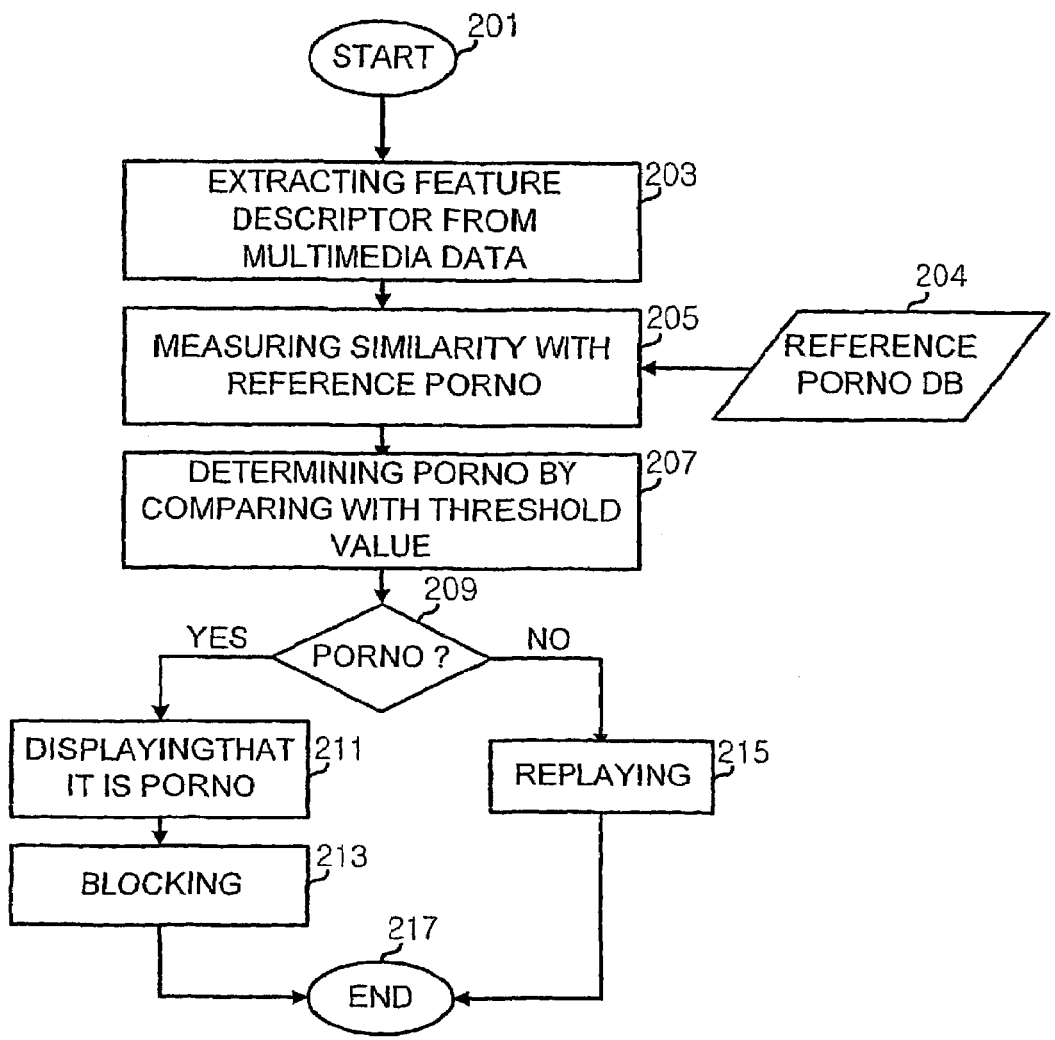
FIG. 2 is a flow chart for showing a method of blocking pornography according to the present invention.

FIG. 2 is a flow chart for showing a method of blocking pornography according to the present invention. As shown in FIG. 2, first, multimedia data is read 201, 203 from web document or data storage device. And then, meta data comprising standard descriptor and descriptor structural device thereof based on MPEG-7 scheme is extracted 203 from the inputted data. The extracted MPEG-7 meta data is expressed as the following formula 1.

$$F=(f_1, f_2, \ldots, f_{n-1}, f_n)$$ [FORMULA 1]

The F is in a form of vector and the structural elements thereof are $f_i$. The extracted MPEG-7 meta data has N structural elements.

The MPEG-7 standard meta data is used to analyze images and to determine whether it is a pornography or not. Whether it is a pornography or not is determined by measuring the degree of similarity 204 referring to reference pornography database. That is, pornographies used for reference of grade are databased in a form of MPEG-7 meta data in reference pornography database. The MPEG-7 meta data of specific reference pornography in the database is expressed as the following formula 2.

$$F'=(f_1', f_2', \ldots, f_{n-1}', f_n')$$ [FORMULA 2]

The F' is in a form of vector and the structural elements thereof are $f_i'$. The meta data of pornography used for reference is a vector having N structural elements. The database is used to determine grade of pornography, including the operation of storing reference meta data for determination in memory or file.

The grade of pornography is determined by measuring the similarity degree between the MPEG-7 meta data extracted in a step of 203 and reference X pornography meta data referred to in a step of 204. The similarity degree is expressed in a vector distance of the two meta data as the following formula 3.

$$d = \text{distance } (F, F') = \sum_{i=1}^{n} |f_i - f_i'|$$ [FORMULA 3]

The d is a measure for quantitatively measuring the similarity degree. The formula 3 is an example of measurement of similarity degree and as described above, not only Euclidian distance, other methods of measuring similarity degree between two vectors are used for measuring similarity degree. As the similarity degree of two frame data grows higher, that of two meta data becomes higher. Therefore, when the similarity degree is measured by Euclidian distance as in the formula 3, the similarity degree d has a small value.

Subsequently, whether it is a pornography or not is determined 207. As shown in the following formula 4, when the similarity degree measured in a step of 205 is smaller than or equal to a predetermined value, it is determined to be a pornography and when the similarity degree is larger than the predetermined value, it is determined to be not a pornography.

d≤T: a pornography d>T: not a pornography [FORMULA 4]

Here, the T is a threshold value of similarity. The threshold value of similarity is determined by a range of allowable error. Then, the multimedia data is replayed or blocked 209,213,215,217 according to the result of pornography determination in a step of 207. It is desirable that when it is determined to be a pornography, a step is further included to display the result 211 so that users select the treatment.

Figure 3:
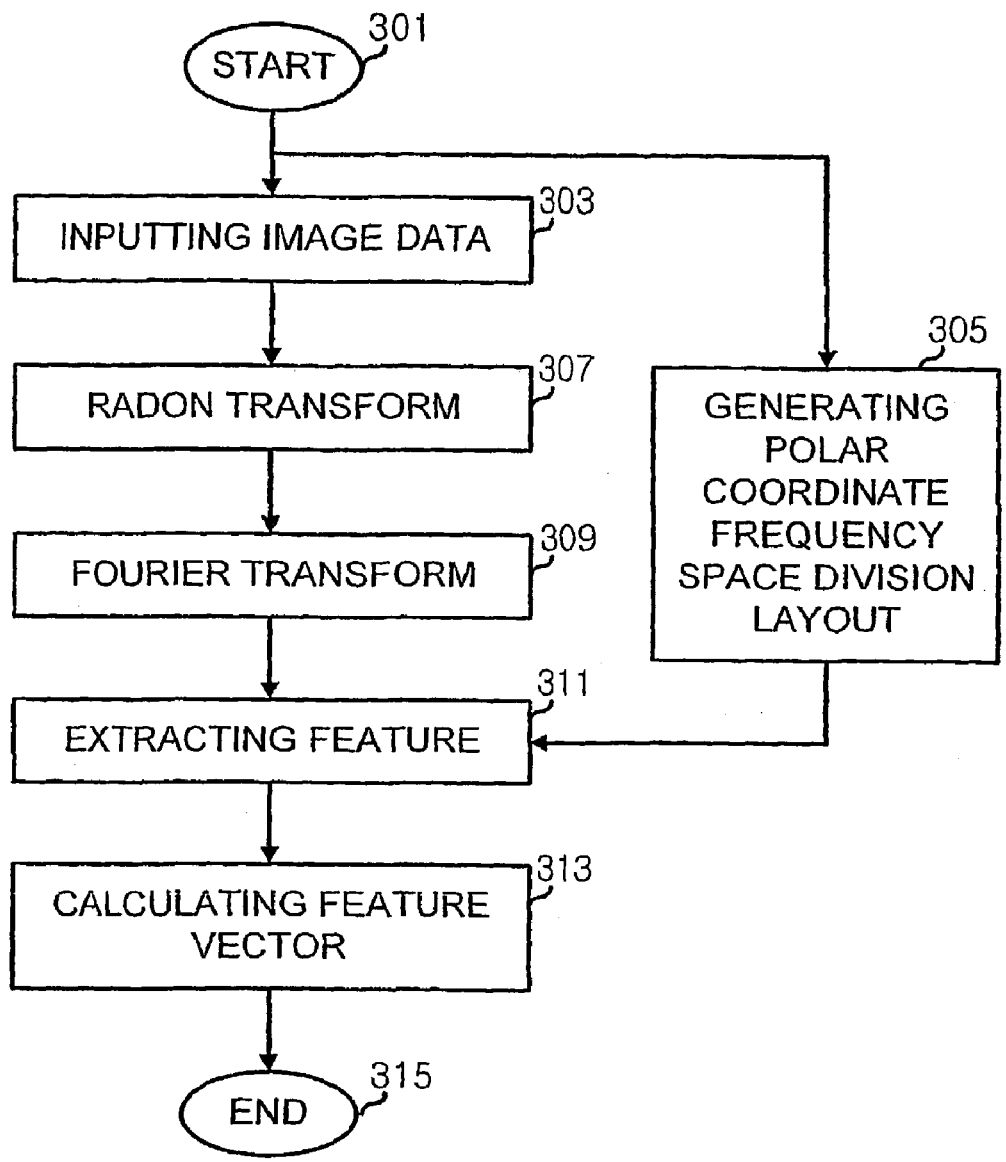
FIG. 3 is a flow chart for showing processes to form texture of image data by using polar coordinates frequency space according to the present invention.

FIG. 3 is a flow chart for showing processes of extracting texture descriptor of image data by using polar coordinates frequency space according to the present invention.

First, image data is inputted 301,303 and then the inputted image data is subjected to radon transform. The radon transform is a process to obtain one dimensional projected data, performing linear decomposition of two dimensional image or multi dimensional multimedia data by the angle. That is, the radon transform uses the principle that an object is to be seen differently according to the viewing angle and outline of the object is to be measured by viewing the object from all the angles.

The radon transform formula of the two dimensional image is expressed as the following formula 5.

$$p_\theta(R) = \int_{L(R,\theta)} f(x,y) dl = \int_{-\infty}^{\infty} \int_{-\infty}^{\infty} f(x,y) \delta(x\cos\theta + y\sin\theta - s) dx dy$$ [FORMULA 5]

The f(x,y) is an image function in a rectangular coordinates system and the $p_\theta(R)$ is a linear projected function obtained by performing line integral according to a ray axis that passes through the origin of the rectangular coordinates system and forms an angle of θ with a positive x axis, that is, a linear radon transform function.

δ(x) is a function that when x is 0, the corresponding value becomes 1. The two dimensional image has an area of −∞<x, y<∞ in the rectangular coordinates system and an area of 0<s<∞, 0<θ<π in a radon coordinates system. That is, when x cos θ+y sin θ=s, it becomes that δ(x cos θ+y sin θ−s)=1

In the above, the set of linear radon transform function $p_\theta(R)$ obtained by rotating θ from 0 degree to 180 degree is referred to as signogram and the signogram is subjected to fourier transform 309. The relational formula of the signogram by fourier transform and fourier function obtained by performing fourier transform to image function f(x,y) in the rectangular coordinates system is expressed as the following formula 6.

$$G_\theta(\lambda) = F(\lambda\cos\theta, \lambda\sin\theta) = f(\omega_x, \omega_y)|_{\omega_x=\lambda\cos\theta, \omega_y=\lambda\sin\theta}$$ [FORMULA 6]

The $G_\theta(\lambda)$ is a function of $p_\theta(R)$ by fourier transform. And, λ is $\sqrt{\omega_x^2 + \omega_y^2}$ and θ is $\tan^{-1}(\omega_x/\omega_y)$.

Figure 4:
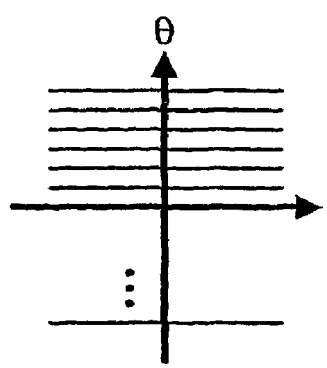
FIG. 4 is a drawing for explaining general central slice theory.
Figure 4:
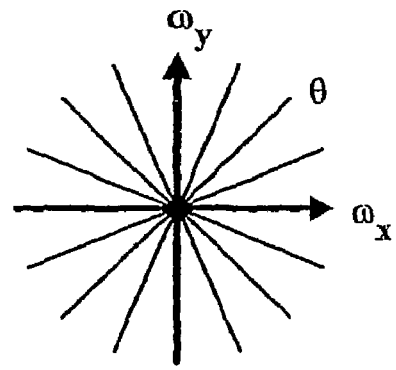

FIG. 4 is a drawing for explaining a general central slice theory. The drawing illustrates relation between signogram (FIG. 4a) and one dimensional fourier transform of signogram (FIG. 4b). The fourier transform of signogram is one dimensional function value obtained by cutting fourier transform function of two dimensional original image according to each θ axis.

Figure 5:
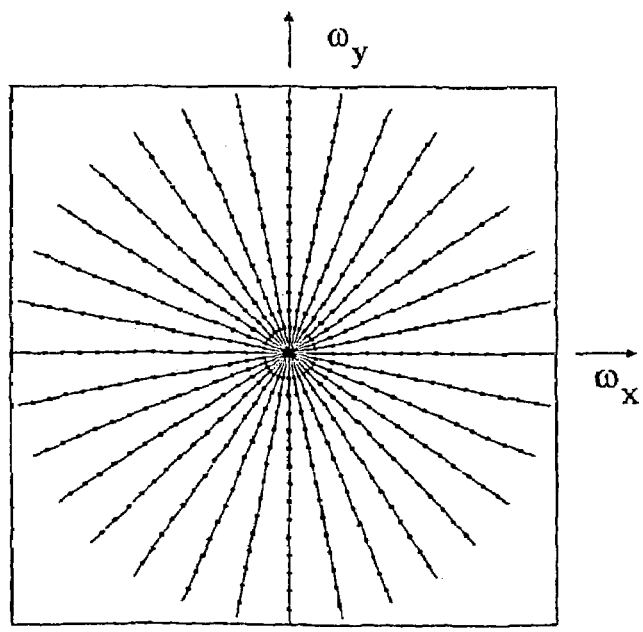
FIG. 5 is a drawing for showing a frequency sampling structure in a polar coordinates corollary frequency area using radon transform.

That is, image function is subjected to radon transform 307 and then fourier transform 309, thereby moving into the polar coordinates frequency space and frequency sampling on the polar coordinates frequency space is shown in FIG. 5.

FIG. 5 is a drawing for showing frequency sampling structure in the polar coordinates system frequency space using radon transform. The image signal is moved into the polar coordinates frequency space by fourier transform using radon transform. The frequency sampling is dense in low frequency space and in mid-low frequency space and the density thereof is lower in high frequency space. This sampling structure corresponds to properties that in general image texture, data is concentrated in mid-low frequency space and the properties extracted from the sampling structure express texture feature of image.

And then, texture feature of image data are extracted 311 in the polar coordinates system frequency space having the frequency sampling structure as shown in FIG. 5. Here, polar coordinates system frequency space division layout is generated 305 and used. Each divided frequency space is referred to as feature channel.

The polar coordinates system frequency space division layout divides frequency space on the basis of Human Visual System (hereinafter referred to as HVS). That is, the HVS has properties that it is sensitive to low frequency and insensitive to high frequency and the frequency layout is determined by using the properties. The properties will be described later in more detail.

According to the present invention, each divided frequency space, that is, energy mean and energy covariance of fourier transform coefficient are used in each channel as texture feature of image data. For this, polar coordinates system frequency layout to calculate energy mean and that to calculate energy covariance are additionally generated.

Figure 6:
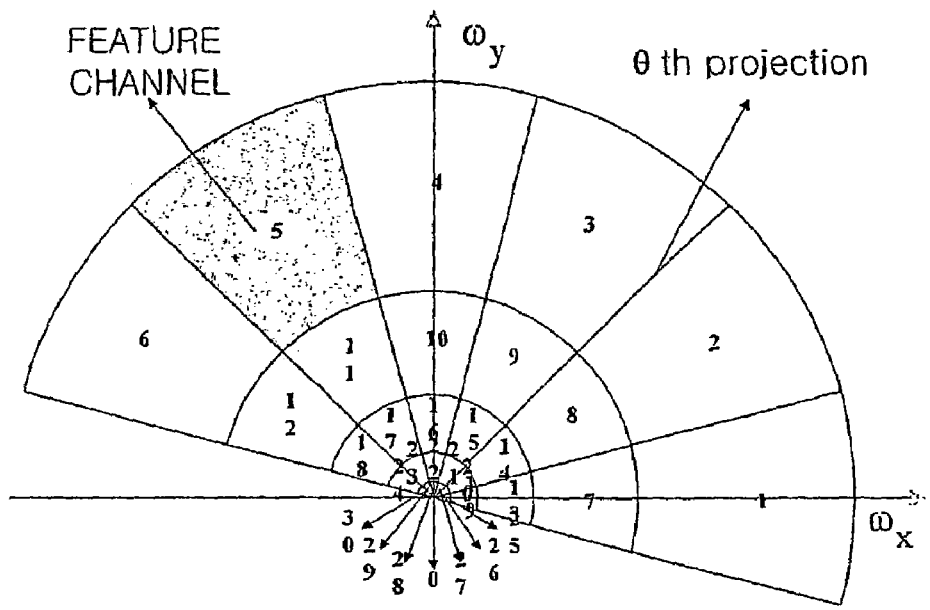
FIG. 6 is a drawing for showing polar coordinates corollary frequency layout used to sample the energy mean of each channel.

FIG. 6 is a drawing for showing polar coordinates frequency space division layout to calculate energy mean on the basis of HVS. As shown in FIG. 6, polar coordinates frequency space is divided into radiation direction and angle direction, wherein the radiation direction is divided from the origin with $2l(0 \leq l \leq \log_2(N/2)-1)$ octave interval and the angle direction divides $\theta$ into 180/P (P indicates divisional resolution of $\theta$). As a result of the division, polar coordinates frequency layout has a pattern that frequency space is densely divided in low frequency space and sparsely divided in high frequency space. Each divided frequency space is a feature channel and slanted part indicates 5 channel.

Figure 7:
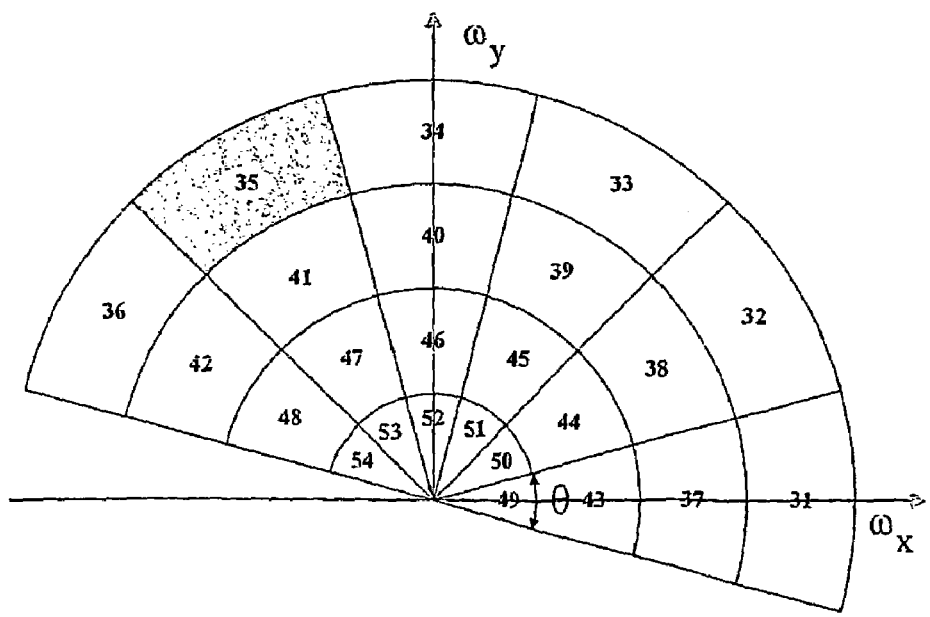
FIG. 7 is a drawing for showing polar coordinates corollary frequency layout used to sample the energy covariance of each channel.

FIG. 7 is a drawing for showing polar coordinates system frequency layout to calculate energy covariance of each channel. The polar coordinates frequency layout to calculate energy covariance is divided uniformly in the radiation direction, differently from that to calculate energy mean. However, the angle direction divides $\theta$ into 180/P as the frequency layout in FIG. 6. Each divided frequency space is a feature channel and the 35$^{th}$ channel has slanted lines thereon.

After energy mean and energy covariance are calculated in each channel, texture descriptor of image expressing texture of image data from the feature values, that is, feature vector is calculated 313. This texture descriptor is expressed as the following formula 7.

$$F=\{e_0, e_1 \ldots e_{P*Q}, d_{P*Q+1}, d_{P*Q+2} \ldots d_{P*Q+P*Q}\} \quad \text{[FORMULA 7]}$$

The $e_i$ indicates energy mean of I channel in frequency layout of FIG. 6 and $e_0$ indicates energy of DC channel. The P indicates the number of space divided from polar coordinates frequency space to angle direction with uniform intervals and Q indicates the number of space divided to radiation direction with octave intervals. The $d_j$ indicates energy covariance of j channel in frequency layout of FIG. 7. The R indicates the number of space divided to radiation direction with uniform intervals.

In the formula 7, each feature value can be expressed firstly, according to the order of priority of channel and data capacity can be reduced by excluding feature value of channel having low importance. And, instead of energy covariance, energy deviation can be used as feature value.

The energy mean $e_i$ and energy covariance $d_j$ comprising the feature vector are calculated by formula 9 and formula 11 and for this, in formula 8, $p_i$ is calculated by using linear radon transform function $G_\theta(\lambda)$ through fourier transform and in formula 10, $q_j$ is calculated by using linear radon transform function through fourier transform and $p_i$ in the formula 8.

$$p_i = \sum_{\lambda_i} \sum_{\theta_i} C(\lambda_i, \theta_i) G_\theta^2(\lambda) \quad \text{[FORMULA 8]}$$

$$e_i = \log(1+p_i) \quad \text{[FORMULA 9]}$$

$$q_i = \sqrt{\sum_{\lambda_i} \sum_{\theta_i} D_j(\lambda_i, \theta_i)[G_\theta^2(\lambda) - p_j]^2} \quad \text{[FORMULA 10]}$$

$$d_j = \log(1+q_j) \quad \text{[FORMULA 11]}$$

As described above, texture descriptor including energy mean and energy covariance of each channel is calculated.

Figure 8:
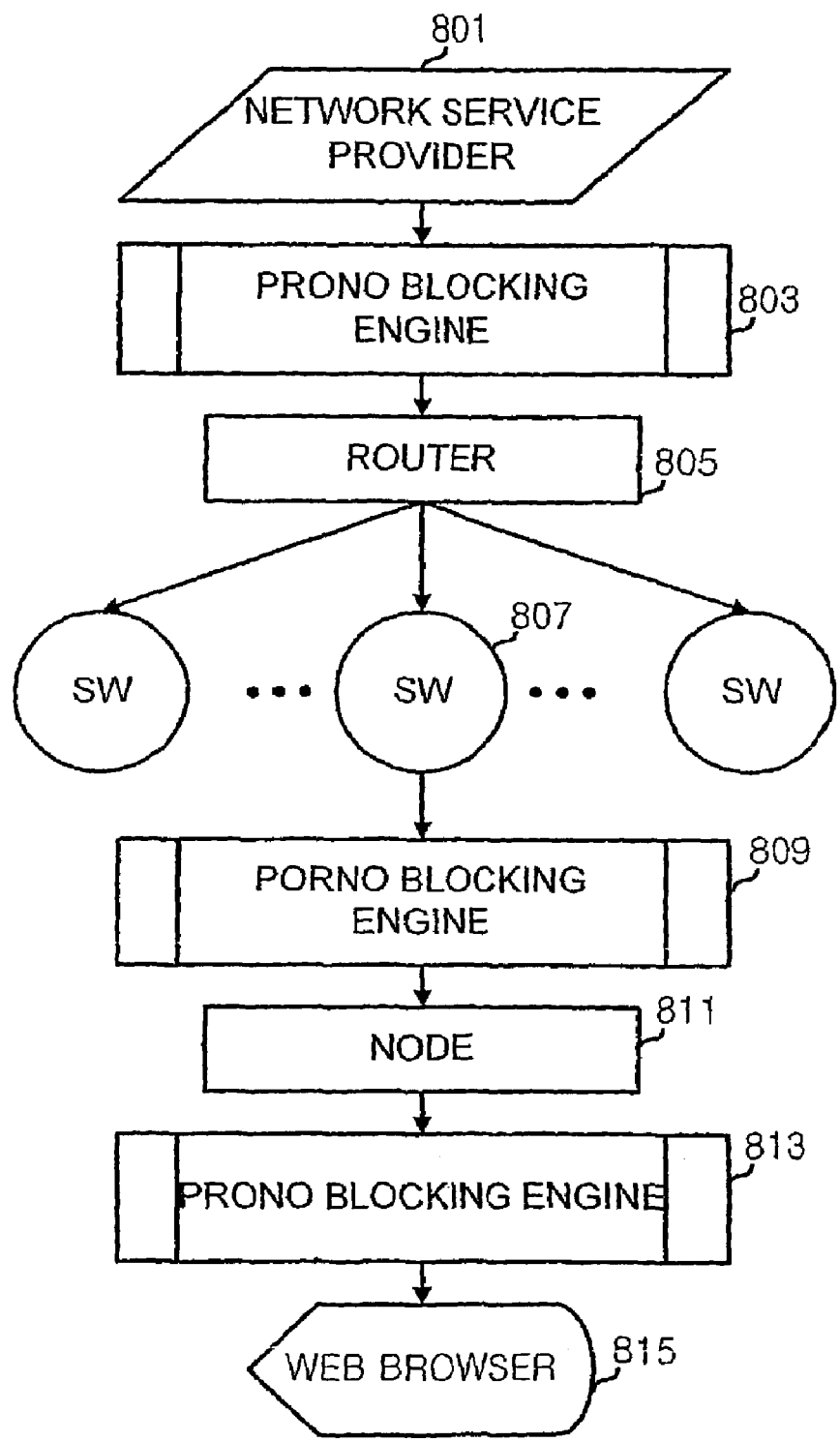
FIG. 8 is a drawing for showing formation processes of engine for blocking pornography in network according to the present invention.

FIG. 8 is a drawing for showing processes of forming engine for blocking pornography in network. As described above, the engine for blocking pornography can be installed in a form of hardware or software between network and web browser of final node. FIG. 8 shows practicable structure when the engine for blocking pornography is installed in network according to the present invention. Referring to FIG. 8, the engine for blocking pornography 803 can be installed on a router 805 distributing communication lines supplied from network 801. And, when the router 805 is connected to final node 811 such as LAN card, being connected to switch 807 such as hub, the engine for blocking pornography can be formed in a form of drive or chip of LAN card. And, the engine for blocking pornography 813 can be installed in a form of software such as plug-in interlocking to the conventional web browser 815.

Figure 9:
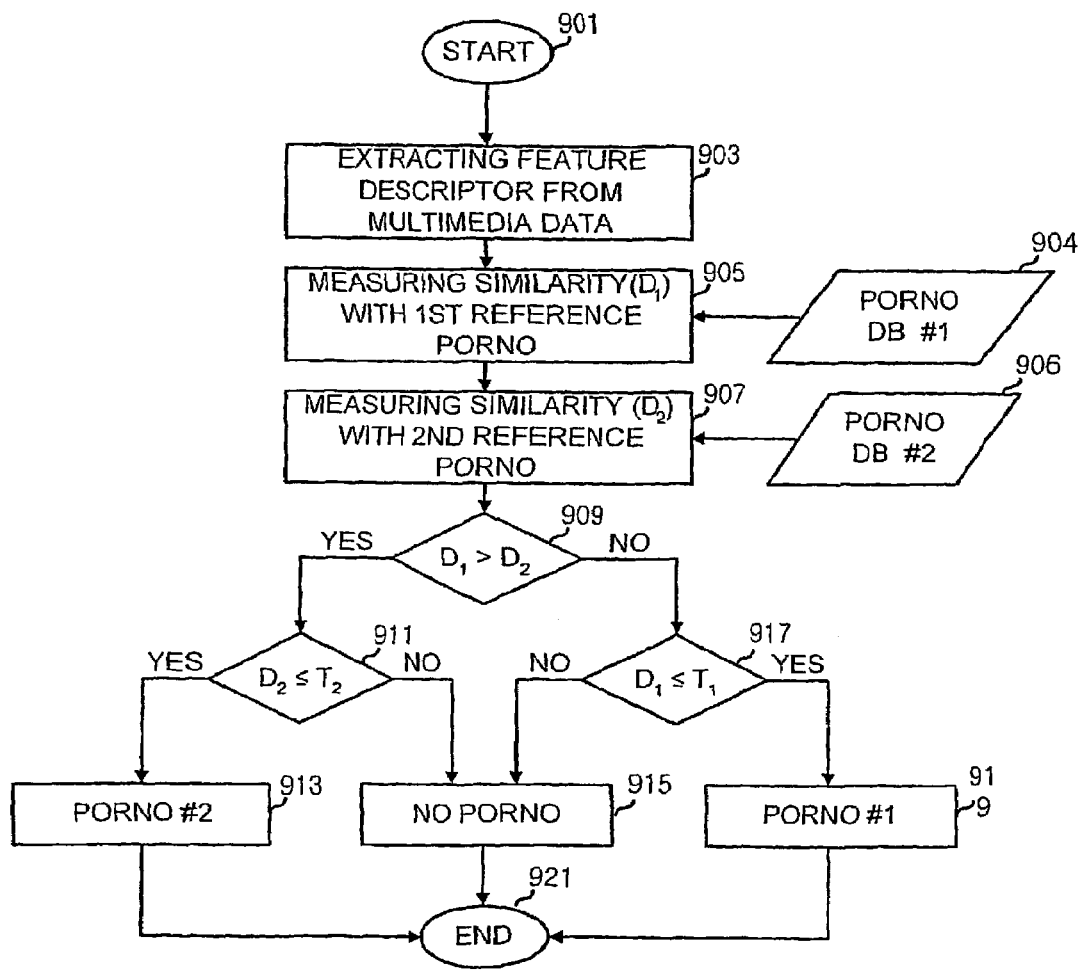
FIG. 9 is a flow chart for showing a method of determining grades of pornography according to the present invention.

FIG. 9 is a flow chart for showing a method of determining grade of pornography according to the present invention. The method is different from that of FIG. 2 in that the reference pornography is classified into 2 grades. In the FIG. 9, D1 indicates similarity between feature descriptor of inputted multimedia data and that of a first reference pornography and D2 indicates similarity between feature descriptor of inputted multimedia data and that of a second reference pornography. And, TI indicates a first pornography measurement threshold value determining a reference of first pornography in the relation with the first reference pornography and T2 indicates a second pornography measurement threshold value determining a reference of second pornography in the relation with the second reference pornography.

That is, first, feature descriptor is extracted from inputted multimedia data 901,903 as described above. And, referring to the first reference pornography database 904, the extracted feature descriptor is subjected to measurement of similarity D1 with the first reference pornography and then, referring to the second reference pornography database 906, similarity D2 with the second reference pornography is measured 907. The two similarity D1, D2 are compared to determine to which the inputted multimedia data is similar 909. The similarity is determined by vector distance between two feature descriptors as shown in formula 3 and therefore, if the similarity D1 with the first reference pornography is bigger than the similarity D2 with the second reference pornography, inputted multimedia data is determined to be similar to the second reference pornography. Then, the similarity D2 between the feature descriptor of inputted multimedia data and that of the second reference pornography is compared with the second pornography measurement threshold value and if D2 is smaller than or equal to T2, the inputted multimedia data is determined to be a second pornography 913. However, if D2 is bigger than T2, the inputted multimedia data is determined not to be a pornography 915. In a step of 909, if D1 is not bigger than D2, inputted multimedia data is determined to be similar to the first reference pornography. Therefore, D1 is compared with T1 917 and if D1 is smaller than or equal to T1, it is determined to be a first pornography 919 and if D1 is bigger than T1, it is determined to be not a pornography 915. In the FIG. 9, pornography is classified into 2 grades. However, it is easy to classify pornography into 3 or more grades.

Figure 10:
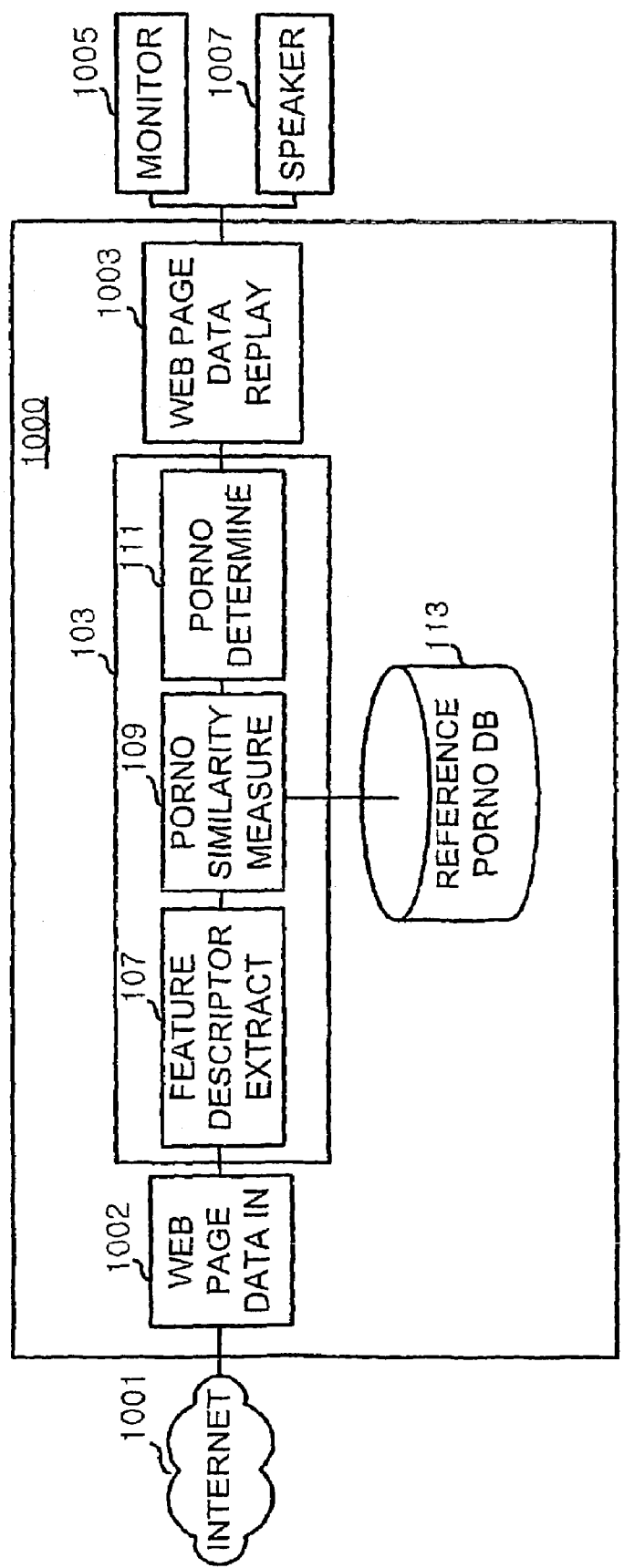
FIG. 10 is a block diagram for showing a device for determining pornography of multimedia data inputted from internet and blocking replay according to the present invention.

FIG. 10 is a block diagram of device for determining pornography of multimedia data inputted from internet according to the present invention and for blocking the replay. Compared with FIG. 1, instead of multimedia data input part 101, web page data input part 1002 is included and instead of multimedia data replay part 105, web page replay part 1003 is included. And, the engine part 103 for blocking pornography is also installed interlocking to the reference pornography database 113.

The web page data input part 101 is used to read data of web page, for example, HTML file or read from web page storage server for web search, referring to URL address. The data of web page is inputted into the engine for blocking pornography 103 and then, it is determined whether multimedia data thereof is pornography or not and according to the result, contents are replayed in the web page replay part 1003. If the web page is determined to be a pornography, the replay is prohibited.

It is possible to determine whether the multimedia data by FTP/e-mail service is a pornography or not by changing the web page data input part 1002 into FTP/e-mail data input part and the web page replay part 1003 into FTP/e-mail transmission part. The FTP/e-mail data input part reads data through service by internet base file transmission protocol or by e-mail protocol. The data is also inputted into the engine for blocking pornography 103 and then, it is determined whether multimedia data thereof is pornography or not and according to the result, FTP/e-mail transmission part transmits service contents by file transmission protocol or e-mail protocol. If the file or e-mail is determined to be a pornography, it is blocked and the contents can not be transmitted.

Figure 11:
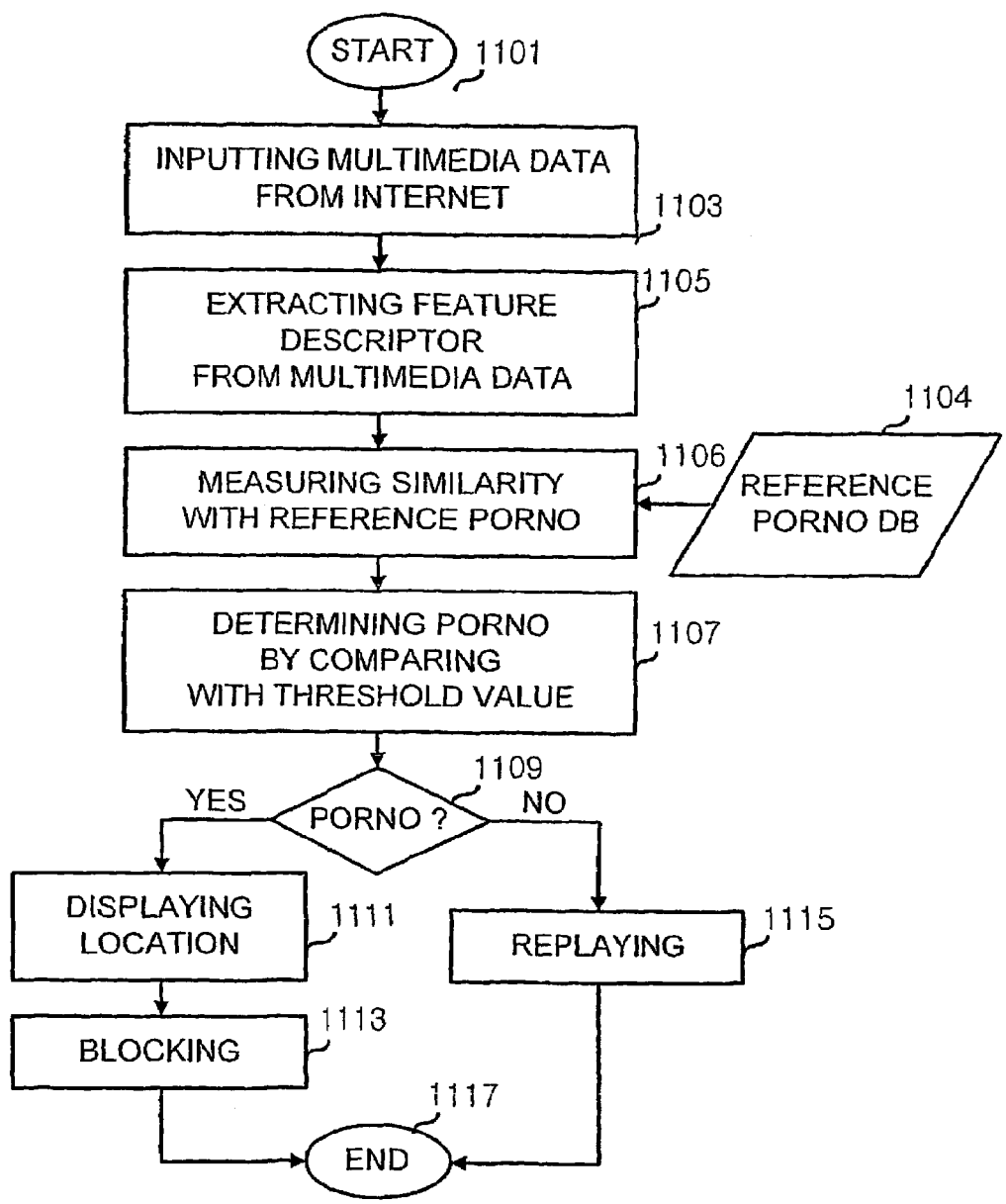
FIG. 11 is a flow chart for showing a method of blocking replay of pornography of multimedia data inputted from internet according to the present invention.

FIG. 11 is a flow chart for showing a method of blocking replay of pornography of multimedia data inputted from internet according to the present invention. As described above, multimedia data is inputted by inputting web page data or FTP/e-mail 1101,1103. Then, as shown in FIG. 2, feature descriptor is extracted from the inputted multimedia data 1105 and referring to reference pornography database 1104, similarity with reference pornography is measured 1106 and it is determined whether it is a pornography or not 1107 by comparing pornography measurement threshold value. If the multimedia data inputted from internet is determined to be a pornography, the replay and transmission are blocked 1113 and if it is determined not to be a pornography, the replay and transmission are accomplished 1115. And, if the multimedia data is determined to be a pornography, the internet site thereof can be displayed 1111.

Figure 12:
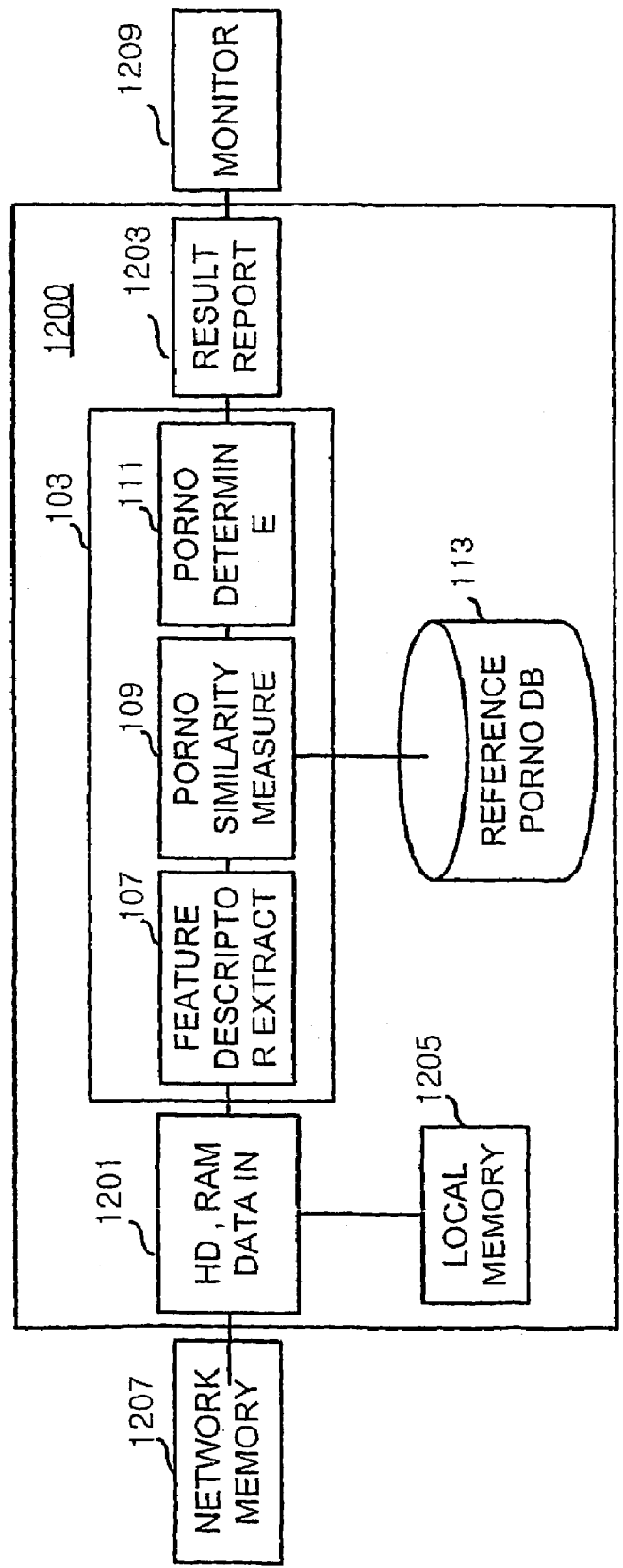
FIG. 12 is a block diagram of a device for searching pornography of multimedia data stored in storage device according to the present invention.

FIG. 12 is a block diagram of device for searching pornography of multimedia data stored in storage device according to the present invention. It is different from that of FIG. 1 in that instead of multimedia data input part 101, storage device data input part 1201 is installed and instead of multimedia data replay part 105, search report part 1203 is installed. However, it is similar to that of FIG. 1 in that it has the engine part for determining pornography 103 interlocking to reference pornography database. The storage device data input part 1201 is used to read multimedia file stationed in hard disk or RAM, being connected to local memory 1205 or network memory 1207. The search report part 1203 is used to report the result of pornography search to manager through monitor 1209. And, the file determined to be pornography is transmitted to the manager by the part 1203.

Figure 13:
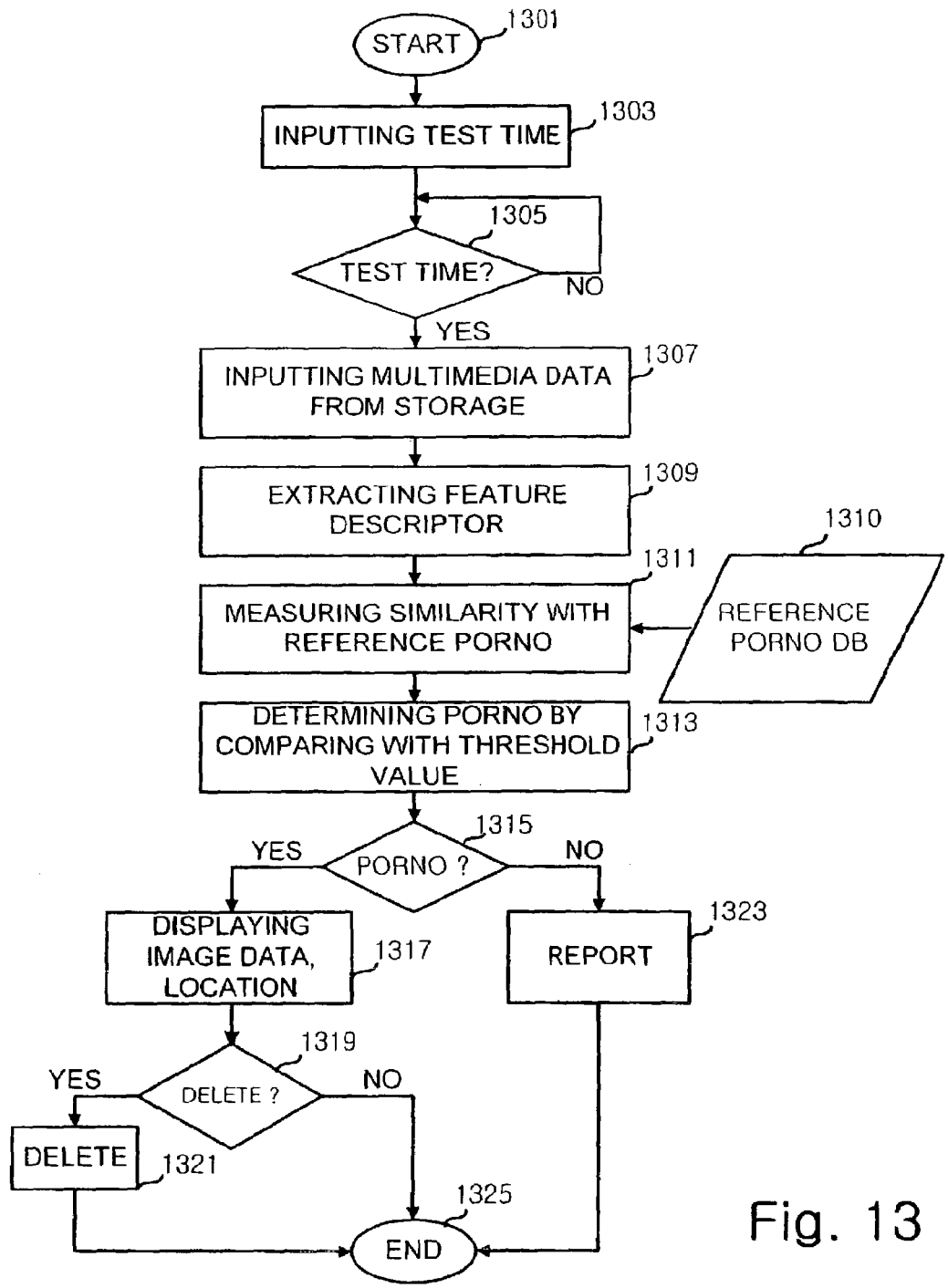
FIG. 13 is a flow chart for showing a method of searching pornography of multimedia data stored in storage device according to the present invention.

FIG. 13 is a flow chart for showing a method of searching pornography of multimedia data stored in storage device according to the present invention. As described above, multimedia data stored in hard disk or RAM is inputted 1307 and then the feature descriptor is extracted 1309 and referring to reference pornography database 1310, similarity with reference pornography is measured 1311. Thereafter, it is determined whether it is a pornography or not by using pornography measurement threshold value 1313.

However, since it is pornography search on multimedia data stored in storage device, if the multimedia data is determined to be a pornography, a step is included for displaying the position in the storage device and checking the corresponding image into image 1317. Moreover, a step can be further included for deleting the image determined to be pornography as a result of search in storage device 1319, 1321. If there is no pornography in the storage device, the result is reported 1323.

It is desirable that a step is further included for reserving search time 1303. It is possible to automatically search hard disk and to automatically report the result by the step.

Figure 14:
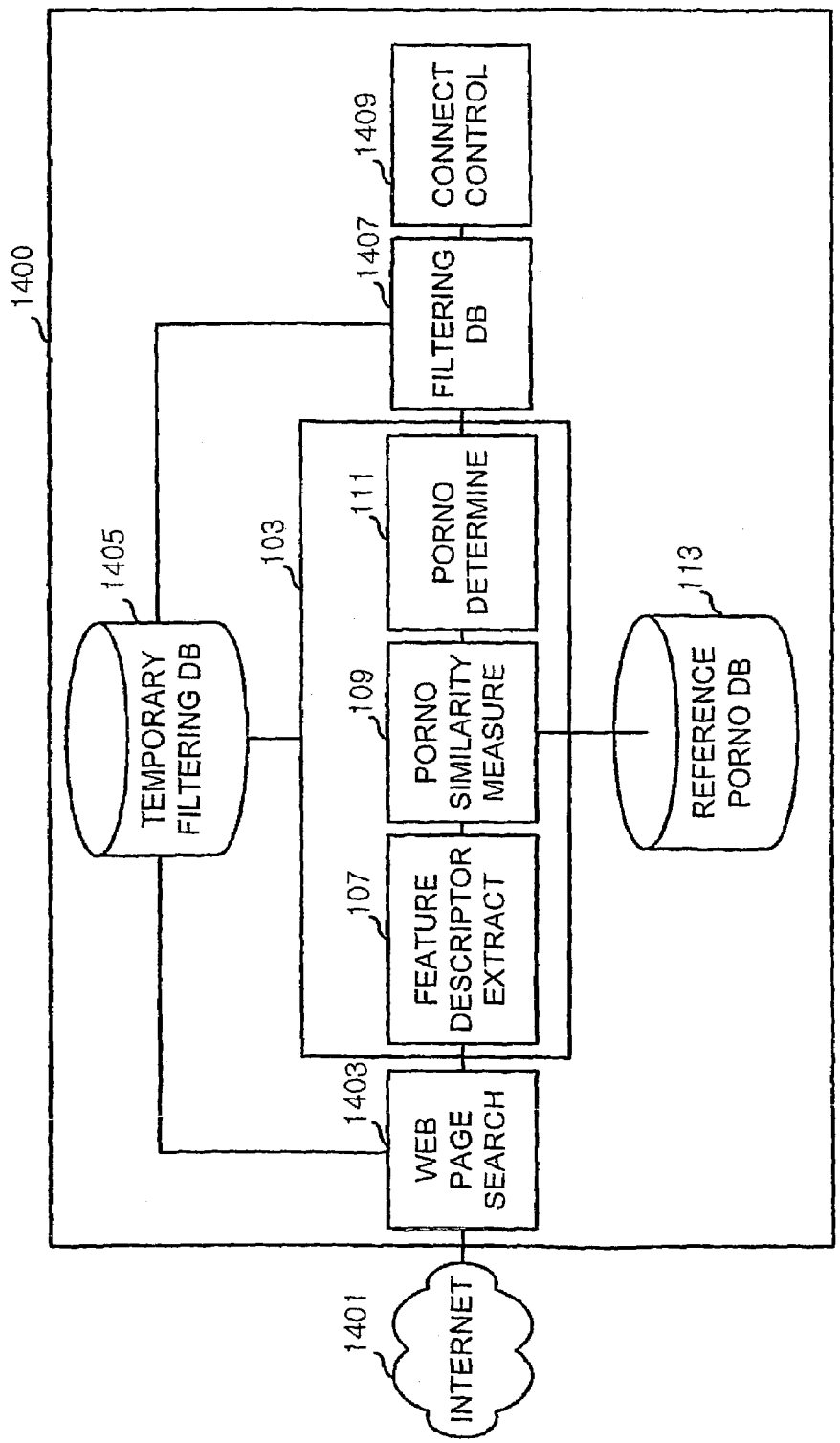
FIG. 14 is a block diagram of a device for automatically generating database of pornography sites.

FIG. 14 is a block diagram of device for automatically generating database of pornography site according to the present invention. It is similar to FIG. 1 in that it has the engine for blocking pornography 103 interlocking to reference pornography database 113. However, it is different from FIG. 1. in that it has a web search part 1403 for searching web document on internet 1401, a temporary filtering database 1405 for temporarily storing sites to be filtered, a filtering database 1407 for storing sites determined to be a pornography as a result of operation of the engine for blocking pornography as sites to be filtered and connection control part 1409 for controlling connection to pornography sites.

Figure 15:
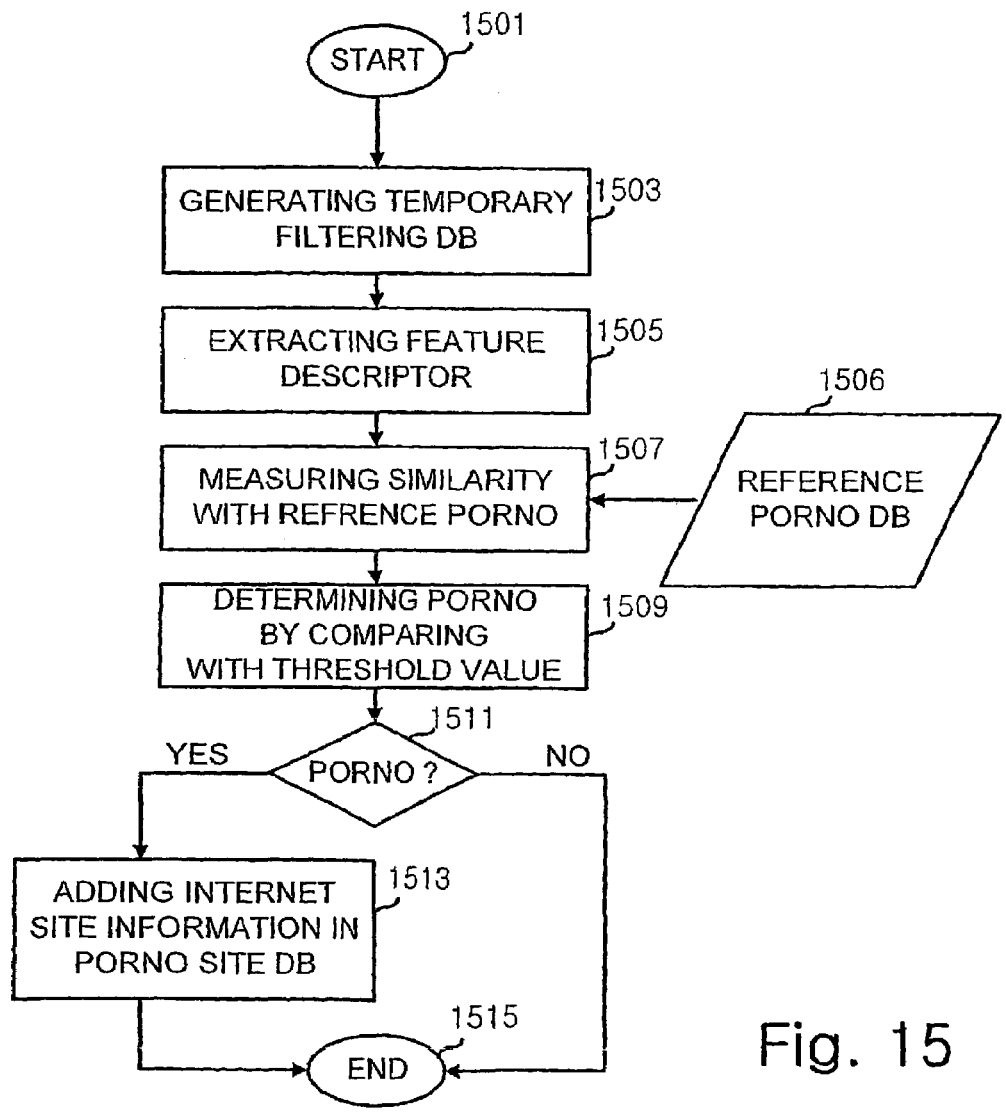
FIG. 15 is a flow chart for showing a method of automatically generating database of pornography sites according to the present invention.

FIG. 15 is a flow chart for showing a method of automatically generating database of pornography sites according to the present invention. It is similar to FIG. 2 in that feature descriptor is extracted 1505 from multimedia data and then referring to reference pornography database 1506, similarity with reference pornography is measured 1507 and finally, it is determined whether it is a pornography or not 1509 by using pornography measurement threshold value. However, it is different from FIG. 2 in that a temporary filtering database is generated 1503 by inputting web document from sites to be filtered through web search engine. If the web document inputted from sites is determined to be pornography, information on the site is added to pornography site database 1513.

As described above, it is possible to receive enormous data of server and be adapted to rapidly changing web conditions by automatically generating database of pornography sites. The database of pornography sites is changed and added by catching the contents of multimedia data and determining whether it is a pornography or not and thereby blocking conventional pornography sites and new pornography sites.

Figure 16:
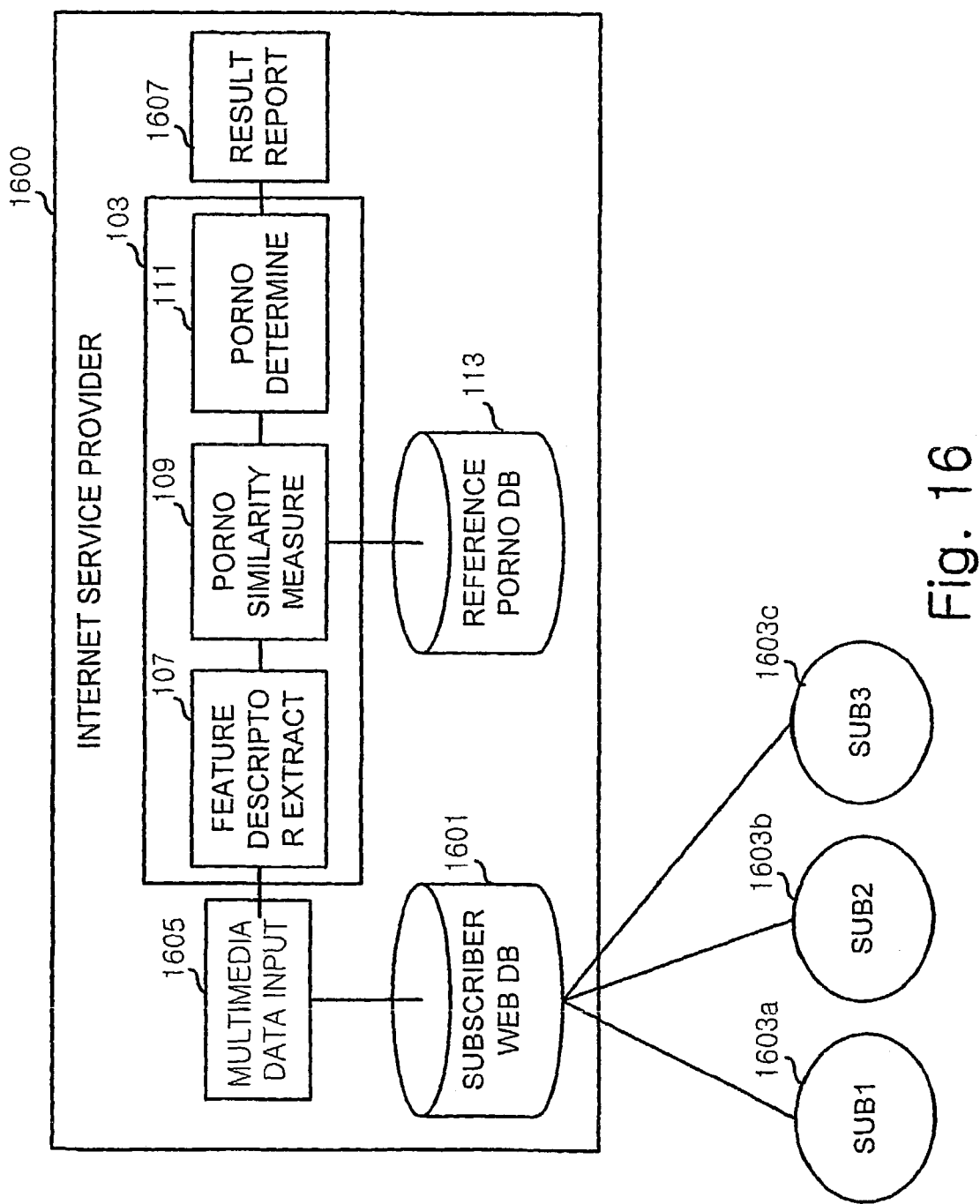
FIG. 16 is a block diagram of a device for searching pornography of subscriber web database by internet service offerer.

FIG. 16 is a block diagram of device for searching pornography of web database of subscriber by supplier of internet service according to the present invention. As shown in FIG. 16, it comprises a subscriber web database

1601 for storing homepage registered by subscriber 1603, web page data input part 1605 and search report part 1607 for reporting the result of search by the engine part 103 for blocking pornography to manager. The web page data input part 1605 is used to input multimedia data of web page stored in the subscriber web database 1601 into the engine part 103 for blocking pornography.

Figure 17:
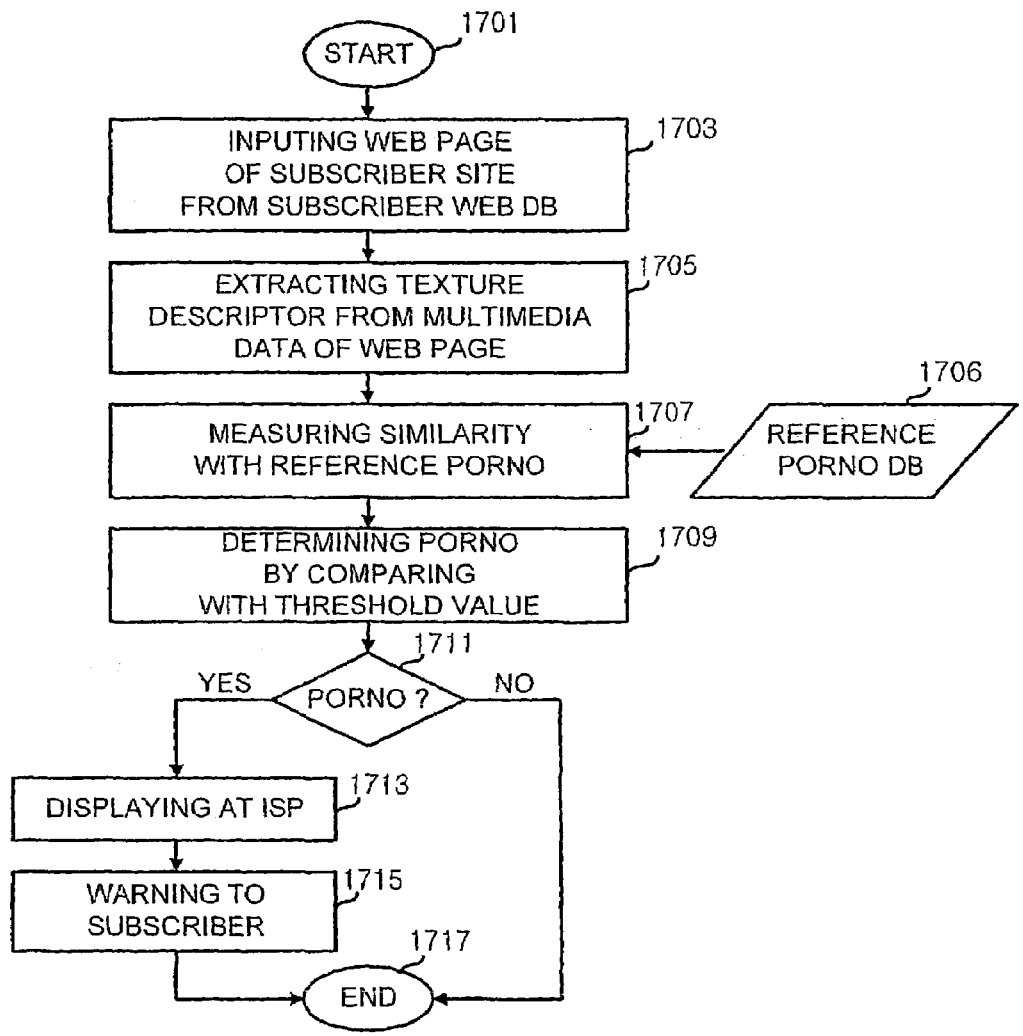
FIG. 17 is a flow chart for showing a method of searching pornography of subscriber web database by internet service offerer.

FIG. 17 is a flow chart for showing a method of searching pornography of web database of subscriber by supplier of internet service according to the present invention. It is different from FIG. 2 in that it has a step for inputting web document of subscriber site from subscriber web database 1703 and a step for reporting the subscriber site including pornography to manager 1713 if it is determined to be a pornography and a step for warning to subscriber 1715.

According to the present invention, it is possible to manage and delete pornography sites by applying to subscriber sites of internet service supplier. It is useful to manage enormous sites by determining pornography of subscriber sites and automatically reporting the result to manager. It can be applied for preventing juveniles from connecting pornography sites by managing the subscriber establishing pornography sites.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applied to accurately determine whether it is a pornography or not on the basis of the contents of multimedia data. Moreover, rapid and efficient pornography determining is possible, because the present invention uses meta data with a small amount of data, instead of original multimedia data.

What is claimed is:

1. A method of filtering pornography contents on internet on the basis of contents of multimedia, comprising the steps of:
generating a feature descriptor of vector value from multimedia data inputted through internet;
measuring similarity by calculating vector distance between the generated feature descriptor and that of the reference pornography; and
determining whether it is a pornography or not by comparing the measured similarity and similarity measurement threshold value, and
blocking the inputted multimedia data if it is determined that the inputted multimedia data is pornography.

2. The method of filtering pornography according to claim 1, wherein the feature descriptor is meta data generated from image data of the multimedia data on the basis of MPEG-7.

3. The method of filtering pornography according to claim 2, wherein the meta data is one on texture descriptor.

4. The method of filtering pornography according to claim 1, wherein if it is determined to be pornography contents by the pornography determining step, a step is further included for displaying the position of the inputted multimedia data on internet.

5. A method of filtering pornography contents in storage device on the basis of contents of multimedia data, comprising the steps of:
inputting multimedia data from the storage device;
generating a feature descriptor from the inputted multimedia data;
measuring similarity by calculating vector distance between the generated feature descriptor and that of the reference pornography, referring to database of reference pornography stored in a form of feature descriptor; and
determining whether it is a pornography or not by comparing the measured similarity and similarity measurement threshold value.

6. The method of filtering pornography according to claim 5, wherein the feature descriptor is generated on image data of the multimedia data on the basis of MPEG-7.

7. The method of filtering pornography according to claim 6, wherein the feature descriptor is a texture descriptor on the basis of MPEG-7.

8. The method of filtering pornography according to claim 6, wherein if it is determined to be pornography contents, a step is further included for displaying the image data on display.

9. The method of filtering pornography according to claim 5, wherein if it is determined to be pornography contents, a step is further included for displaying the position in the storage device.

10. The method of filtering pornography according to claim 5, wherein if it is determined to be pornography contents, a step is further included for deleting the multimedia data from the storage device by a predetermined control signal.

11. The method of filtering pornography according to claim 5, wherein a step is further included for inputting search reserved time of the storage device and during the search reserved time, the steps are performed for generating feature descriptor, measuring similarity and determining whether it is pornography or not.

12. A method of automatically generating database of pornography sites, comprising the steps of:
inputting multimedia data from internet sites to be filtered;
generating a feature descriptor of vector value from the inputted multimedia data;
measuring similarity by calculating vector distance between the generated feature descriptor and that of the reference pornography, referring to database of reference pornography stored in a form of the feature descriptor;
determining whether it is a pornography or not by comparing the measured similarity and similarity measurement threshold value; and
adding information of the internet site to database of pornography sites if it is determined to be pornography by the pornography determining step.

13. The method of generating database of pornography sites according to claim 12, wherein the feature descriptor is meta data generated from image data of the multimedia data on the basis of MPEG-7.

14. The method of generating database of pornography sites according to claim 13, wherein the meta data is one on texture descriptor.

15. The method of generating database of pornography sites according to claim 12, wherein a step is further included for collecting multimedia data from internet sites to be filtered and for generating temporary filtering database through web search engine.

16. A method for blocking pornography sites from computers for server, comprising the steps of generating database of pornography sites and blocking connection of computers for clients to the internet site, if there is a request for connection of the computer for client to the internet sites stored in the database of pornography sites, wherein the step for generating database of pornography sites comprises the steps of:

- generating a feature descriptor of vector value from multimedia data inputted from internet sites to be filtered;
- measuring similarity by calculating vector distance between the generated feature descriptor and that of the reference pornography, referring to the database of reference pornography stored in a form of feature descriptor;
- determining whether it is a pornography or not by comparing the measured similarity and similarity measurement threshold value; and
- adding information on the internet site to database of pornography sites if it is determined to be a pornography by the pornography determining step.

17. The method of generating database of pornography sites according to claim 16, wherein the feature descriptor is meta data generated from image data of the multimedia data on the basis of MPEG-7.

18. The method of generating database of pornography sites according to claim 17, wherein the meta data is one on texture descriptor.

19. A method of filtering pornography contents of subscriber sites from computer for internet service supplier, comprising the steps of:

- inputting web document of the subscriber site from subscriber web database;
- generating a feature descriptor of vector value from multimedia data of the inputted web document;
- measuring similarity by calculating vector distance between the generated feature descriptor and that of the reference pornography, referring to database of reference pornography stored in a form of feature descriptor; and
- determining whether it is a pornography or not by comparing the measured similarity and similarity measurement threshold value.

20. The method of filtering pornography according to claim 19, wherein the feature descriptor is meta data generated from image data of the multimedia data on the basis of MPEG-7.

21. The method of filtering pornography according to claim 20, wherein the meta data is one on texture descriptor.

22. The method of filtering pornography according to claim 19, wherein if it is determined to be pornography sites by pornography determining step, a step is further included for displaying information on the subscriber site in display device of computer for internet service supplier.

23. The method of filtering pornography according to claim 19, wherein if it is determined to be pornography contents by the pornography determining step, a step is further included for transmitting a warning message to the subscriber site.

24. The recording media for reading computer having computer program for filtering pornography contents on the basis of contents of multimedia, wherein the computer program performs the steps of:

- generating a feature descriptor of vector value from inputted multimedia data;
- measuring similarity between the generated feature descriptor and that of reference pornography contents; and
- determining whether it is a pornography or not by comparing the measured similarity and similarity measurement threshold value.

25. The recording media for reading computer having computer program for filtering pornography contents on internet on the basis of contents of multimedia, wherein the computer program performs the steps of:

- generating a feature descriptor from multimedia data inputted through internet;
- measuring similarity by calculating vector distance between the generated feature descriptor and that of the reference pornography, referring to database of reference pornography stored in a form of feature descriptor; and
- determining whether it is a pornography or not by comparing the measured similarity and similarity measurement threshold value.

26. The recording media for reading computer having computer program for filtering pornography contents in storage device on the basis of contents of multimedia, wherein the computer program performs the steps of:

- generating a feature descriptor of vector value from multimedia data in storage device;
- measuring similarity by calculating vector distance between the generated feature descriptor and that of the reference pornography, referring to database of reference pornography stored in a form of feature descriptor; and
- determining whether it is a pornography or not by comparing the measured similarity and similarity measurement threshold value.

27. The recording media for reading computer having computer program for automatically generating database of pornography sites, wherein the computer program performs the steps of:

- generating a feature descriptor from multimedia data inputted from internet sites to be filtered;
- measuring similarity by calculating vector distance between the generated feature descriptor and that of the reference pornography, referring to database of reference pornography stored in a form of feature descriptor;
- determining whether it is a pornography or not by comparing the measured similarity and similarity threshold value; and
- adding information on the internet site to database of pornography sites, if it is determined to be a pornography by the pornography determining step.

28. The recording media for reading computer having computer program for blocking pornography sites from computer for server, wherein the computer program comprises the steps of generating database of pornography sites and blocking connection of the computer for client to the internet site, if there is a request for connection of computer for client to internet sites stored in the database of pornography site, and wherein the step for generating database of pornography sites performs the steps of:

- generating a feature descriptor from multimedia data inputted from internet sites to be filtered;
- measuring similarity by calculating vector distance between the generated feature descriptor and that of the reference pornography, referring to database of reference pornography stored in a form of feature descriptor;
- determining whether it is a pornography or not by comparing the measured similarity and similarity measurement threshold value; and adding information on the internet site to database of pornography sites, if it is determined to be a pornography by the pornography determining step.

29. The recording media for reading computer having computer program for filtering pornography contents of subscriber sites from computer for internet service supplier, wherein the computer program performs the steps of:
   generating a feature descriptor from multimedia data inputted from subscriber site;
   measuring similarity by calculating vector distance between the generated feature descriptor and that of the reference pornography, referring to database of reference pornography stored in a form of feature descriptor; and
   determining whether it is a pornography or not by comparing the measured similarity and similarity measurement threshold value.

30. A processing unit of multimedia data comprising:
   means for inputting multimedia data from Internet;
   means for generating a feature descriptor of vector value from the inputted multimedia data;
   memory means for storing reference pornography in a form of the feature descriptor;
   means for measuring similarity between the generated feature descriptor and that of reference pornography stored in the memory means; and
   means for determining whether it is a pornography or not by comparing the measured similarity and similarity measurement threshold value.

31. The processing unit for multimedia data according to claim 30, wherein a multimedia replay means is further included for blocking replay of the multimedia data, if the multimedia data is determined to be pornography by the pornography determining means.

32. A network connecting device for connecting a plurality of separated networks comprising:
   means for inputting multimedia data from internet;
   means for generating a feature descriptor of vector value from the inputted multimedia data;
   memory means for storing reference pornography in a form of the feature descriptor;
   means for measuring similarity between the generated feature descriptor and that of reference pornography stored in the memory means; and
   means for determining whether it is a pornography or not by comparing the measured similarity and similarity measurement threshold value.

33. The network connecting device according to claim 32, wherein a means is further included for blocking transmission of the multimedia data between the networks, if the multimedia data is determined to be a pornography by the pornography determining means.

34. A LAN card installed in multimedia data processing unit for preparing LAN circumstances, comprising:
   means for inputting multimedia data from internet;
   means for generating a feature descriptor of vector value from the inputted multimedia data;
   memory means for storing reference pornography Ln a form of the feature descriptor;
   means for measuring similarity between the generated feature descriptor and that of reference pornography stored in the memory means; and
   means for determining whether it is a pornography or not by comparing the measured similarity and similarity measurement threshold value.

35. The LAN card according to claim 34, wherein a means is further included for blocking transmission of the multimedia data, if the multimedia data is determined to be a pornography by the pornography determining means.

* * * * *